(12) United States Patent
Ezawa et al.

(10) Patent No.: US 8,147,076 B2
(45) Date of Patent: Apr. 3, 2012

(54) BEAM-DOWN TYPE SOLAR RAY LIGHTING DEVICE

(75) Inventors: Kazuaki Ezawa, Tokyo (JP); Hiroo Inoue, Tokyo (JP); Takashi Kawaguchi, Tokyo (JP); Yuzuru Hamada, Osaka (JP)

(73) Assignee: Mitsui Engineering & Shipbuilding Co., Ltd., Tokyo (JP)

( * ) Notice: Subject to any disclaimer, the term of this patent is extended or adjusted under 35 U.S.C. 154(b) by 0 days.

(21) Appl. No.: 12/733,800

(22) PCT Filed: Oct. 30, 2008

(86) PCT No.: PCT/JP2008/069727
§ 371 (c)(1),
(2), (4) Date: Mar. 19, 2010

(87) PCT Pub. No.: WO2009/057679
PCT Pub. Date: May 7, 2009

(65) Prior Publication Data
US 2010/0246039 A1   Sep. 30, 2010

(30) Foreign Application Priority Data

Oct. 31, 2007   (JP) ................................. 2007-284569

(51) Int. Cl.
*G02B 5/10* (2006.01)
*G02B 7/182* (2006.01)
*F24J 2/10* (2006.01)

(52) U.S. Cl. ........ 359/851; 359/853; 359/857; 359/869; 359/871; 359/900; 126/684; 126/685; 126/696; 353/3

(58) Field of Classification Search .................. 359/851, 359/857, 867, 869, 853, 871, 900; 353/3; 126/684, 685, 696
See application file for complete search history.

(56) References Cited

U.S. PATENT DOCUMENTS

| | | | | |
|---|---|---|---|---|
| 3,297,390 A | * | 1/1967 | Erickson | 359/366 |
| 4,044,753 A | * | 8/1977 | Fletcher et al. | 126/600 |
| 4,455,153 A | * | 6/1984 | Jakahi | 48/62 R |
| 4,457,297 A | * | 7/1984 | Sobczak et al. | 126/605 |

(Continued)

FOREIGN PATENT DOCUMENTS

JP   2000-146310 A1   5/2000

(Continued)

OTHER PUBLICATIONS

Kribus et al., "A Solar-Driven Combined Cycle Power Plant," Solar Energy, vol. 62, No. 2, Feb. 1998, pp. 121-129 (9).

*Primary Examiner* — Ricky Shafer
(74) *Attorney, Agent, or Firm* — Jacobson Holman PLLC (57) ABSTRACT

An object is to provide a solar ray lighting device which is capable of reducing the blocking and the shadowing of beams of light reflected by heliostats and which is capable of fixing firmly and stably a heavy and large-sized center reflector. In a beam-down type solar ray lighting device, at least three supporting blocks are assembled together to form a pyramidal shape. In addition, an outer circumferential edge of the center reflector is fixed to the supporting posts so that the outer circumferential edge of the center reflector can internally touch the supporting posts.

5 Claims, 8 Drawing Sheets

U.S. PATENT DOCUMENTS

| | | | | |
|---|---|---|---|---|
| 4,581,897 A | * | 4/1986 | Sankrithi | 60/641.12 |
| 4,608,964 A | * | 9/1986 | Russo | 126/688 |
| 4,720,170 A | * | 1/1988 | Learn, Jr. | 359/597 |
| 4,762,298 A | * | 8/1988 | Wood | 248/179.1 |
| 4,784,700 A | | 11/1988 | Stern et al. | |
| 5,016,998 A | * | 5/1991 | Butler et al. | 359/847 |
| 5,076,031 A | * | 12/1991 | Hancock | 52/63 |
| 5,760,979 A | * | 6/1998 | Saito | 359/859 |
| 5,979,438 A | * | 11/1999 | Nakamura | 126/680 |
| 6,532,953 B1 | * | 3/2003 | Blackmon et al. | 126/685 |
| 2006/0124168 A1 | | 6/2006 | Momii et al. | |

FOREIGN PATENT DOCUMENTS

| | | |
|---|---|---|
| JP | 2004-169059 A | 6/2004 |
| JP | 2005-106432 A | 4/2005 |
| WO | WO 2005017421 A1 | 2/2005 |

* cited by examiner

Prior art

BEAM-DOWN TYPE SOLAR RAY LIGHTING DEVICE

CROSS-REFERENCE TO RELATED APPLICATIONS

This is a national stage of PCT/JP008/06727 filed Oct. 30, 2008 and published in Japanese, which has a priority of Japan no. 2007-284569 filed Oct. 31, 2007, hereby incorporated by reference.

BACKGROUND OF THE INVENTION

1. Field of the Invention

The present invention relates to a beam-down type solar ray lighting device. More specifically, the present invention relates to a solar ray lighting device which is capable of reducing the occurrence of the blocking and the shadowing of the beams of light reflected by heliostats and which is also capable of supporting a center reflector stably and firmly.

2. Description of Related Art

Recently, there has been an increase in interest in the global environments such as: air pollution caused by exhaust gas produced by the combustion of fossil fuels; and the depletion of fossil fuels. In addition, alternative energy that may replace the aforementioned fossil fuels has attracted more public attention. For such alternative energy, wind power generation and photovoltaic power generation have been spreading.

Meanwhile, there is a concentrating-type solar thermal electric power generation system in which a heat-transfer medium is heated by use of heat produced by concentrating solar rays, steam is produced by the heat of the heat-transfer medium, a steam turbine is driven by the steam, and consequently electric power is generated. The system has attracted public attention because the system can be operated with similar power-generating facilities to those for the conventional thermal power station and can achieve a high output level.

Various types of concentrating-type solar thermal electric power generation systems have been proposed thus far, including a trough-type solar thermal electric power generation system (see, for example, Patent Document 1), a tower-type solar thermal electric power generation system (see, for example, Patent Document 2), and a dish-type solar thermal electric power generation system (see, for example, Patent Document 3). The trough-type system includes: reflectors each having a semi-circular sectional shape and having a light-reflecting surface formed in one surface thereof; and pipes extending in the axial directions of the respective reflectors, and a heat-transfer medium is introduced into the pipes. The tower-type system includes: a tower placed at the center and provided with a heat-transfer-medium heating portion on a top portion thereof; and multiple heliostats placed around the tower. The dish-type system includes: a bowl-shaped reflector having a light-reflecting surface formed in one surface thereof; and a heat-transfer-medium heating portion provided near the reflector.

Meanwhile, the reflector of the trough-type solar thermal electric power generation system has quite a large dimension in the width direction of the reflector. Since the reflectors are installed in lengthwise and widthwise, there is a problem that the trough-type system entails massive-scale installation.

The tower-type solar thermal electric power generation system is capable of increasing the light concentration in a relatively easy way simply by increasing the number of heliostats to be provided. Nevertheless, the tower-type system has its own problems. Firstly, the heat-transfer medium, such as a molten salt, is supplied to and is circulated through the heat-transfer-medium heating portion provided on the upper-end side of the tower. Accordingly, there is a problem that, at night when no solar rays are available, the tower-type system must keep the temperature of the molten salt by use of heating means such as an electric heater so as to prevent the molten salt from solidifying. In addition, the piping system for the molten salt becomes so long that the temperature of the molten salt is lowered, resulting in lower power generating efficiency of the tower-type system.

The dish-type solar thermal electric power generation system is a compact-sized system because the heat-transfer medium is heated by collecting the solar rays for each of the reflectors. There is a problem that the dish-type system, however, is not appropriate for massive-scale electric-power generation.

A system known as a beam-down solar thermal electric power generation system has been proposed as a different system from the above-described concentrating-type solar thermal electric power generation systems (see, for example, Non-Patent Document 1).

Patent Document 1: WO2005/017421
Patent Document 2: Japanese patent application Kokai publication No. 2005-106432.
Patent Document 3: Japanese patent application Kokai publication No. 2004-169059.
Non-Patent Document 1: *Solar Energy*, Volume 62, Number 2, February 1998, pp. 121-129(9)

Figure 18:
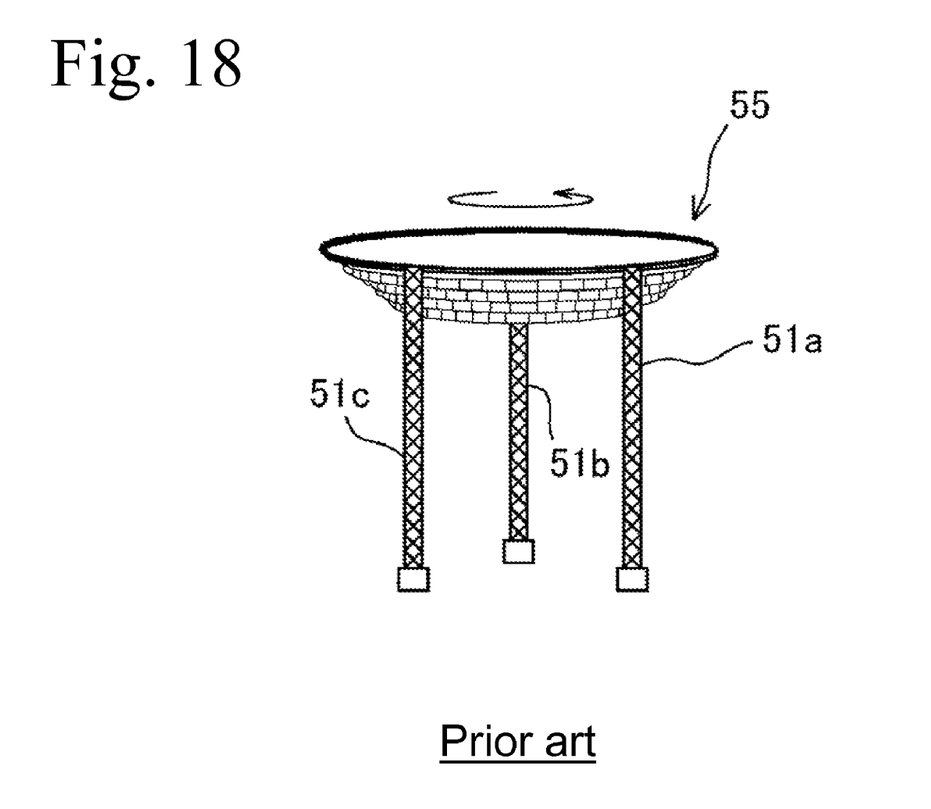
FIG. 18 is a diagram illustrating a conventional center-reflector supporting apparatus.

As FIG. 18 shows, the beam-down solar thermal electric power generation system includes: three supporting posts 51a, 51b and 51c that stand vertically and have a truss structure; and a disc-shaped center reflector 55 (central reflector mirror) that is supported by the posts 51a, 51b and 51c. No reinforcing members are allowed to be placed between the supporting posts because such reinforcing members cause blocking and shadowing to take place. The central reflector mirror 55 sometimes has such a large diameter that exceeds 100 m. The central reflector mirror 55 has a structure with long intervals between every two supporting posts. Such a structure is made possible by combining structural pipes (multiple pipes with joint means). The central reflector mirror 55 sometimes has such a heavy weight that exceeds 3000 tons.

Accordingly, the supporting posts standing vertically without any reinforcing members provided in between have problems of an extremely low proof stress against the rotary force in the circumferential direction of the central reflector mirror, low resistibility against wind forces and low resistibility against lateral loads at the time of earthquakes. Moreover, the load on each of the supporting posts is large.

In addition, each supporting post is fixed at a fixing portion to the center reflector on the upper-end side and at an anchor portion on the bottom-end side of the supporting post. Such a structure can provide neither stability nor strength to the supporting posts. Accordingly, the power generating efficiency is eventually decreased by occurrence of problems concerning the safety, the life, and the offsetting of optical axis caused by the distortion or the incorrect positioning of the center reflector.

Furthermore, there is another problem. When the number of the supporting posts is increased in order to improve the strength, the blocking and the shadowing may occur, and thus the power generating efficiency is decreased. For this reason, the strength cannot be improved.

BRIEF SUMMARY OF THE INVENTION

In view of the aforementioned problems that the conventional techniques have, an object of the present invention is to provide a supporting apparatus which is capable of reducing the blocking and the shadowing of the beams of light reflected by the heliostats and which is also capable of fixing firmly and stably a heavy and large-sized center reflector.

An apparatus for supporting a center reflector in a beam-down solar thermal electric power generation system according to the present invention has the following configuration.

1) A solar ray lighting device including a plurality of heliostats to reflect solar rays and a center reflector to concentrate beams of light reflected by the heliostats on heat-transfer-medium heating means is characterized in that at least three supporting posts are assembled together to form a pyramidal shape, and the center reflector is fixed to the supporting posts so that an outer circumferential edge of the center reflector internally touches the posts.

To be more specific, basically three tilting supporting posts as a basic component are fixed together at their respective uppermost assembly portions so as to form a pyramidal shape. The bottom portion of each supporting post is fixed by an anchor in the ground. Accordingly, the structure can be constructed in a structurally stable state. The conventional structure has a problem of structural instability (e.g., the decrease in the proof stress against the rotary force in the exercise direction of the central reflector mirror; low resistibility against lateral loads caused by wind forces or earthquakes) because no reinforcing members is allowed to be placed between the supporting posts. The above-described structure can solve the problem.

A structure for supporting the disc-shaped structure of the center reflector (central reflector mirror) is provided to each of the three supporting posts at a designated height thereof so as to fix the center reflector. In some cases where the supporting portions are separated far away from one another at a large distance, it is possible to form a structure capable of suspending the center reflector from the vertex of the pyramid by means of plural cable- or bar-shaped hanger means. In this case, being placed above the center reflector, the cables and the hanger means will not expand the area where the heliostats placed in a wide area for collecting solar rays must not be placed.

2) A solar ray lighting device including a plurality of heliostats to reflect solar rays and a center reflector to concentrate beams of light reflected by the heliostats on heat-transfer-medium heating means is characterized in that at least two supporting posts which are connected and fixed together at their respective upper-end portions and which tilt with their respective base portions separated away from each other, and the center reflector suspended by a plurality of cable- or bar-shaped hanger means that are provided to the supporting posts is fixed to the supporting posts.

To be more specific, the structure which includes basically two tilting supporting posts as a basic component and in which the center reflector (central reflector mirror) is suspended can reduce, more than in the case described in the item 1), the area where no heliostats can be provided. Accordingly, a decrease in the light collecting ability can be prevented from being caused by the shadowing or by the blocking.

In addition, while each of the supporting posts is being constructed by such a method as the cantilever erection method, back anchors may be provided sequentially to help the construction.

3) A solar ray lighting device including a plurality of heliostats to reflect solar rays and a center reflector to concentrate beams of light reflected by the heliostats on heat-transfer-medium heating means, the solar ray lighting device characterized in that a single supporting post is provided in a tilting state, and the center reflector suspended by a plurality of cable- or bar-shaped hanger means that are provided to the supporting post is fixed to the supporting post.

The structure which includes basically a single tilting supporting post as a basic component and in which the center reflector (central reflector mirror) is suspended can reduce, more than in the case described in the items 1) and 2), the area where no heliostats can be provided. Accordingly, a decrease in the light collecting ability can further be avoided.

In addition, the solar ray lighting device is made to be a stable structure by providing a back anchor in the same direction as the tilting supporting post.

The structure in which the center reflector is suspended from the top of the supporting posts allows the center reflector to be suspended stably by plural cable- or bar-shaped hanger means as long as the center reflector has a size of a certain predetermined range. Accordingly, certain structural stability of the center reflector can be accomplished.

In this case, being placed above the center reflector, the cables and the hanger means will not expand the area where the heliostats placed in a wide area for collecting solar rays must not be placed.

1) The three supporting posts that form the sides of a triangular pyramid can reduce the blocking and the shadowing as compared to a case where many supporting posts are made to stand vertically for the purpose of supporting the center reflector. The heliostats can be provided more densely, which brings about an increase in the amount of light collection. Consequently, the amount of electric-power generation can also be increased.

The three supporting posts, which are like the sides of a triangular pyramid, and the three supporting posts are fixed together at a vertex, of the triangular pyramid, on their respective upper-end sides. Thus, the strength is considerably enhanced. Accordingly, the heavy and large-sized center reflector can be fixed stably and firmly. Consequently, the solar ray lighting device can have higher safety and a longer serviceable life. In addition, the beams of light reflected by the heliostats can be led to a receiver (an apparatus for heating a molten salt or the like) with higher accuracy.

2) By providing two supporting posts, the blocking and the shadowing can be reduced further, and thereby more heliostats can be provided.

3) By providing one supporting post, the blocking and the shadowing can be reduced even further, and thereby heliostats can be provided more densely than ever before.

4) Either the vertex or a hanger portion is provided on the axial line of the center reflector, so that the center of gravity of the center reflector coincides with the position of either the vertex or the hanger portion. Accordingly, the center reflector can be held stably.

DESCRIPTION OF SYMBOLS

A center-reflector supporting apparatus
1 supporting post
2 fixing portion
3 ring (ring)
4 center reflector
5 hanger cable
11 back anchor
14 heliostat
18 heating apparatus

DETAILED DESCRIPTION OF THE INVENTION

Hereinafter, a beam-down type solar ray lighting device according to the present invention will be described by illustrating an embodiment according to the present invention. Examples described below are of cases in each of which the solar ray lighting device according to the present invention is applied as examples to a solar thermal electric power generation system.

EXAMPLE 1

Outline of Solar Ray Lighting Device

Figure 1:
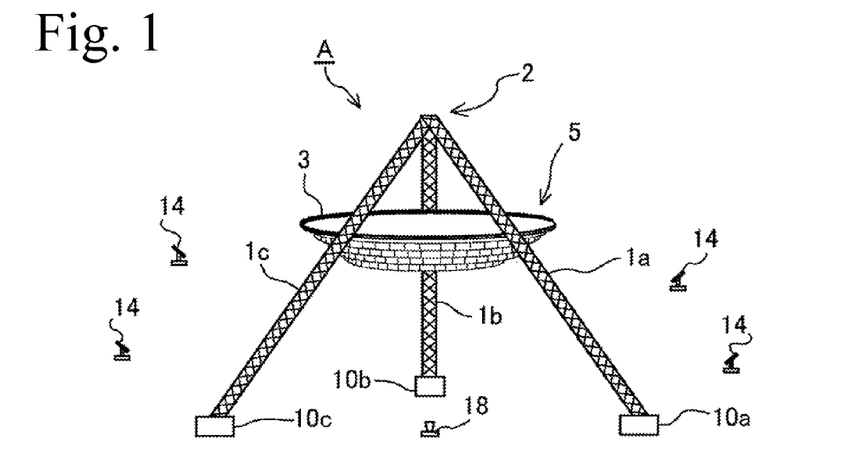
FIG. 1 is a schematic diagram illustrating a solar ray lighting device according to the present invention.

FIG. 1 is a schematic diagram illustrating the general configuration of a solar ray lighting device A according to the present invention. As shown in this figure, a disc-shaped center reflector 5 is supported by three supporting posts, and multiple heliostats 14 are placed so as to surround the center reflector 5. A molten-salt heating apparatus 18 is provided on the ground at a position located on the center axis of the center reflector 5. The molten-salt heating apparatus 18 includes a receiver and a molten-salt furnace. The receiver has, for example, a funnel shape, and receives the solar rays reflected by the center reflector 5. The molten-salt furnace heats and melts a heat-transfer medium such as a molten salt. In addition, unillustrated electric-power generating facilities including a steam generator, a steam turbine, and the like are provided to generate electric power.

In Example 1, as FIG. 1 shows, three supporting posts 1a, 1b, and 1c are provided to form a triangular pyramid structure, and the center reflector 5 is supported by the three sides of the triangular pyramid.

As shown in FIG. 1, a one-end side of each of the three support posts 1a, 1b, and 1c is fixed so as to form the vertex (which will be referred to as a "fixing portion 2") of the triangular pyramid. The other end of each of the support posts 1a, 1b, and 1c is fixed to a corresponding one of anchors 10a, 10b, and 10c, which are buried in the ground.

Figure 2:
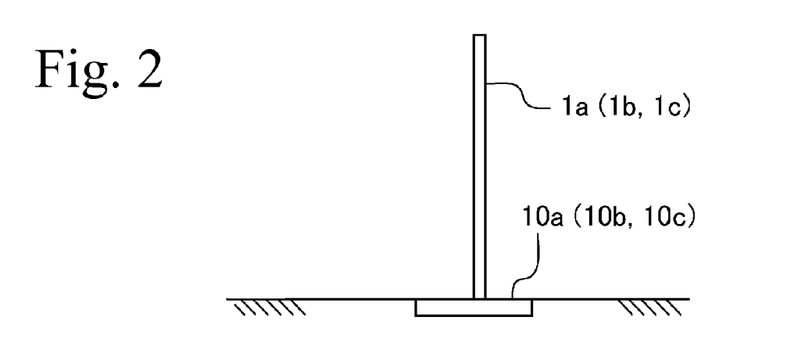
FIG. 2 is a diagram describing a method of constructing supporting posts of the solar ray lighting device according to the present invention.
Figure 3:
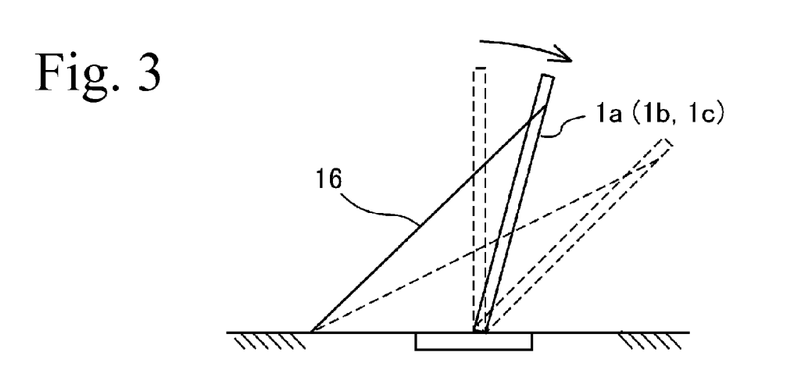
FIG. 3 is a diagram describing the method of constructing the supporting posts of the solar ray lighting device according to the present invention.

The supporting posts 1a, 1b and 1c which are configured as described above to support the center reflector 5 are constructed in accordance with the procedure illustrated in FIGS. 2 and 3. Firstly, the supporting post 1a is made to stand vertically on the anchor 10a. Then, a temporary stay cable 16 is provided to the supporting post 1a, and the post 1a is made to tilt so as to make a predetermined tilt angle. Likewise, the other two supporting posts 1b and 1c are made to tilt, and then the upper ends of these three supporting posts 1a, 1b, and 1c are connected and fixed together. Then, at the last stage, the center reflector is lifted up and fixed at a predetermined position. When the temporary stay cables 16 are removed, the construction is completed.

According to this example, the center reflector can be held stably and firmly, so that safety and life are improved. In addition, the offsetting of the optical axis reaching the receiver to receive the solar rays can be reduced, so that both the burden and the cost of the maintenance of the center reflector can be alleviated.

In addition, the blocking and the shadowing of the beams of light reflected by the heliostats 14 are reduced, so that the heliostats 14 can be provided in wider area. Accordingly, the light collecting efficiency can be enhanced and, as a consequence, the power generating efficiency can also be enhanced.

In addition, the simple way of constructing the solar ray lighting device makes it possible to reduce the construction cost and to shorten a construction period.

EXAMPLE 2

Figure 4:
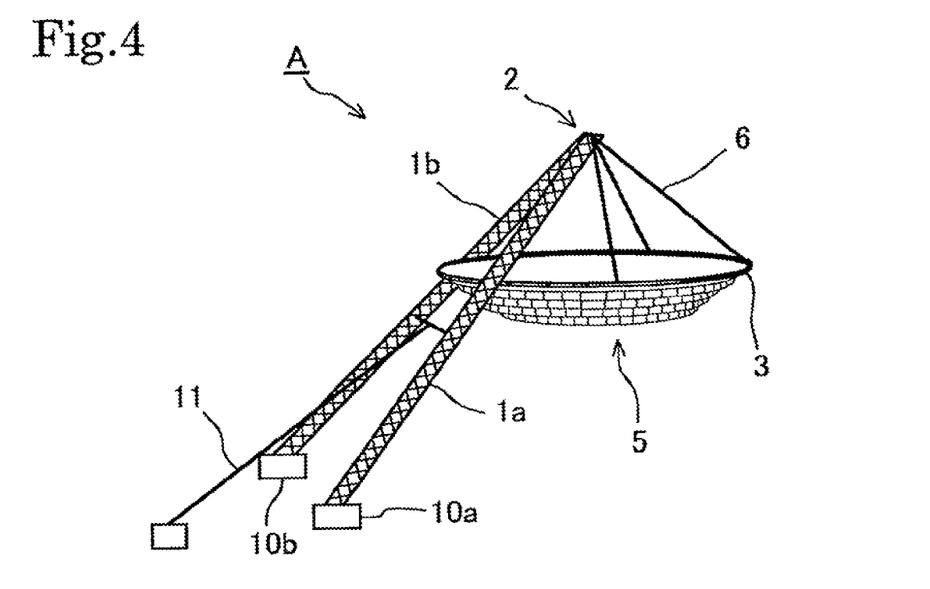
FIG. 4 is a schematic diagram illustrating a solar ray lighting device according to a second embodiment according to the present invention.
Figure 5:
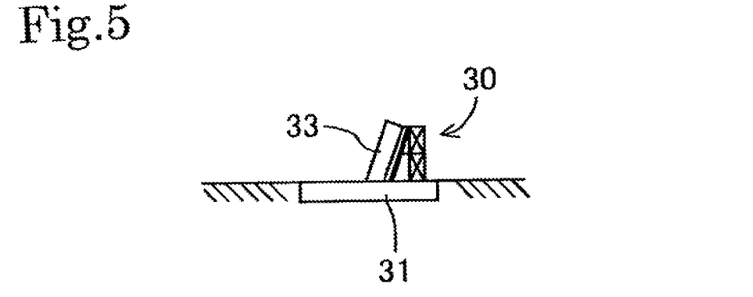
FIG. 5 is a diagram describing one other method of constructing supporting posts of the solar ray lighting device according to the present invention.

In this example, a center reflector 5 is supported by a triangular structure formed by two supporting posts 1a and 1b as FIG. 4 shows.

Figure 6:
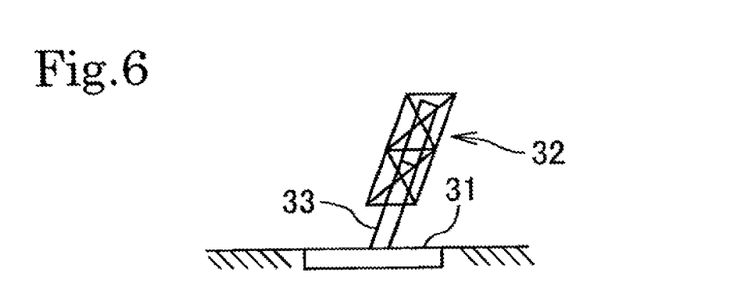
FIG. 6 is a diagram describing the one other method of constructing the supporting posts of the solar ray lighting device according to the present invention.

The supporting posts 1a and 1b to support the center reflector 5 are constructed by a method such as the cantilever erection method. For example, firstly, a base portion 33 and total scaffoldings 30 are constructed on an anchor 31, as FIG. 4 shows. Then, as FIG. 6 shows, an erection apparatus 32 including a formwork is provided at the top-end side of the base portion 33. The supporting post is formed so as to extend sequentially the length of the supporting post.

Figure 7:
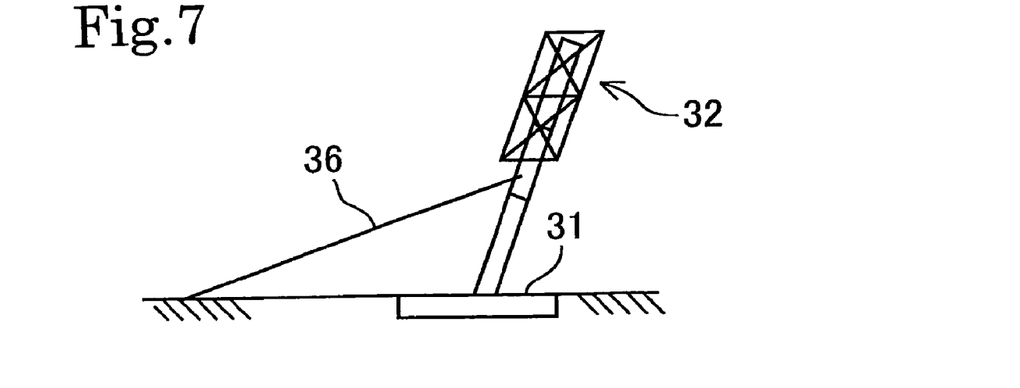
FIG. 7 is a diagram describing one other method of constructing the supporting posts of the solar ray lighting device according to the present invention.
Figure 8:
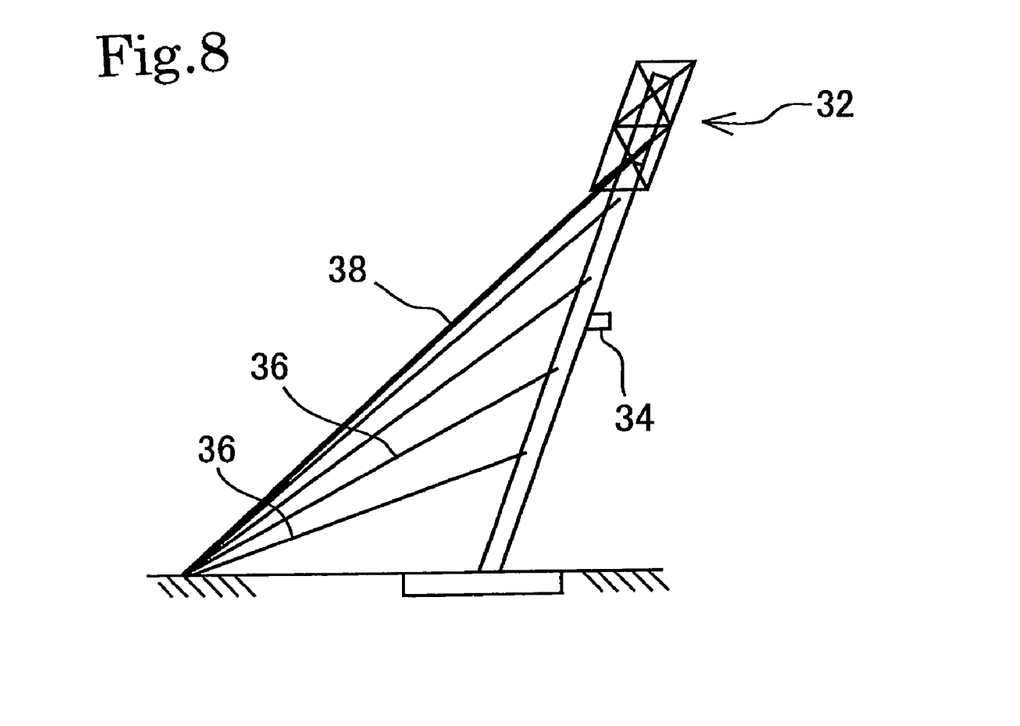
FIG. 8 is a diagram describing one other method of constructing the supporting posts of the solar ray lighting device according to the present invention.

In addition, as FIG. 7 shows, plural stays 36 for erection are sequentially provided along with the extension of the supporting post. The stays 36 for erection support the supporting post by giving a tension to the supporting post. Besides, a horizontal-beam joint member 34 is formed as FIG. 8 shows. The horizontal-beam joint member 34 is used for connecting a horizontal beam that is used for fixing the center reflector at the time of casting concrete.

Figure 9:
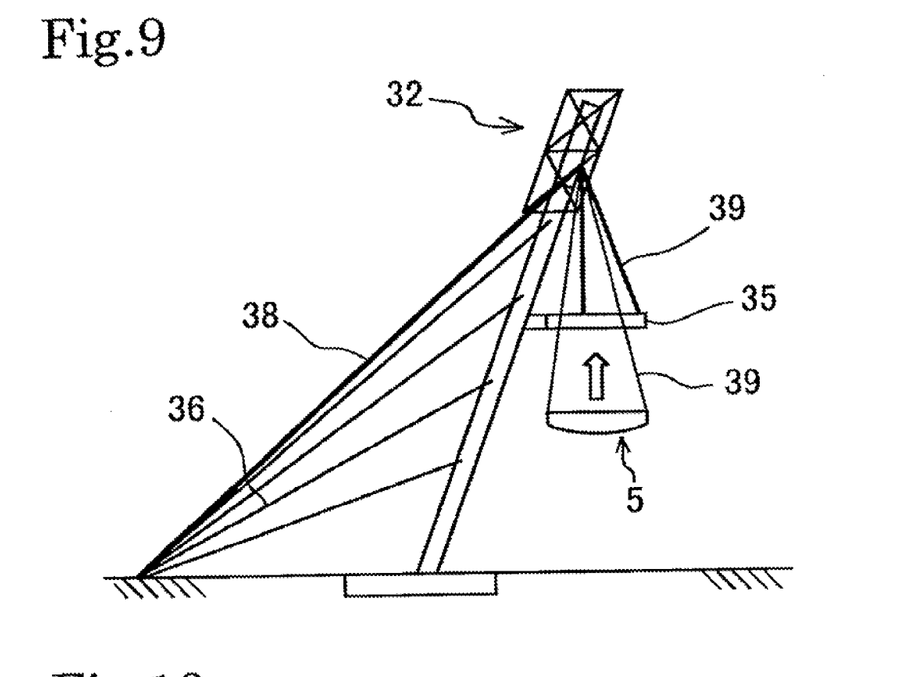
FIG. 9 is a diagram describing one other method of constructing the supporting posts of the solar ray lighting device according to the present invention.

As FIG. 9 shows, a permanent stay 38 is provided on a top-end side of the supporting post 1a. The top-end portion of the supporting post 1a is connected and fixed to the top-end portion of the supporting post 1b that has been constructed in a similar manner, so that a triangular shape is formed. Then, a horizontal beam 35 is lifted up and is then fixed to the joint members 34. Subsequently, the center reflector 5 is lifted up and is then connected to the horizontal beam 35, and the circumferential edge portion of the center reflector 5 is connected to the top-end sides of the supporting posts 1a and 1b by means of plural hanger cables 39.

Figure 10:
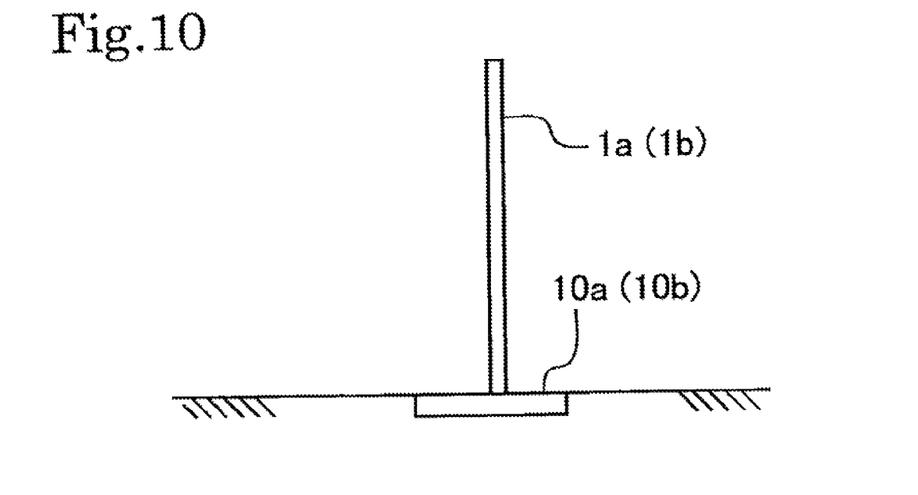
FIG. 10 is a diagram describing a method of constructing supporting posts of the solar ray lighting device according to the present invention.
Figure 11:
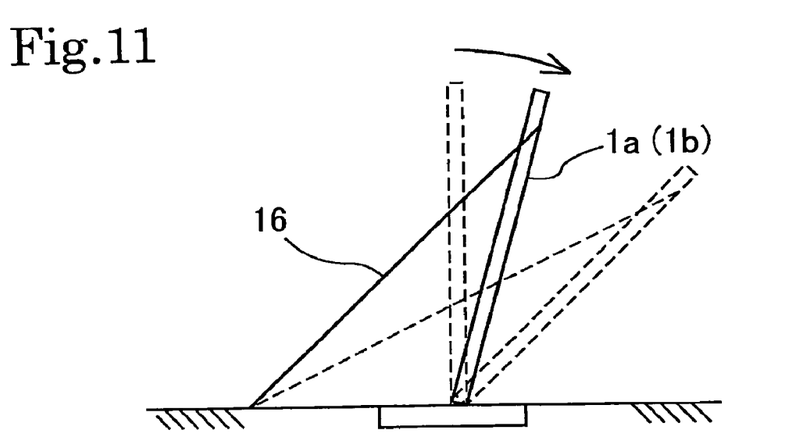
FIG. 11 is a diagram describing the method of constructing the supporting posts of the solar ray lighting device according to the present invention.
Figure 12:
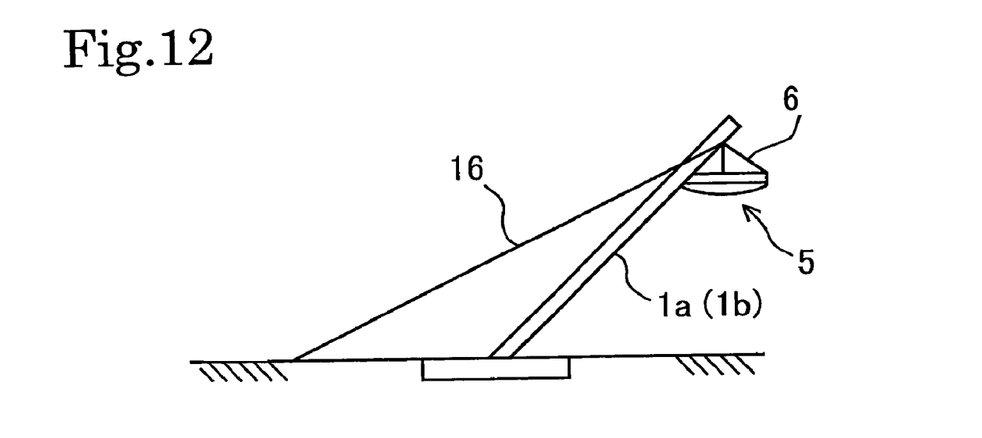
FIG. 12 is a diagram describing the method of constructing the supporting posts of the solar ray lighting device according to the present invention.

Another method is as follows. Firstly, as FIG. 10 shows, a supporting post 1a is made to stand vertically on an anchor 10a. Then, as FIG. 11 shows, a permanent stay 16 is provided to the supporting post 1a and the supporting post 1a is made to tilt so as to make a predetermined tilt angle. The top end of the supporting post 1a is connected and fixed to the top end of another supporting post 1b that has been constructed in a similar manner. Then, a center reflector 5 is lifted up and is then fixed to predetermined positions of the supporting posts 1a and 1b. At the same time, hanger wires 6 are provided to support the center reflector 5.

Figure 13:
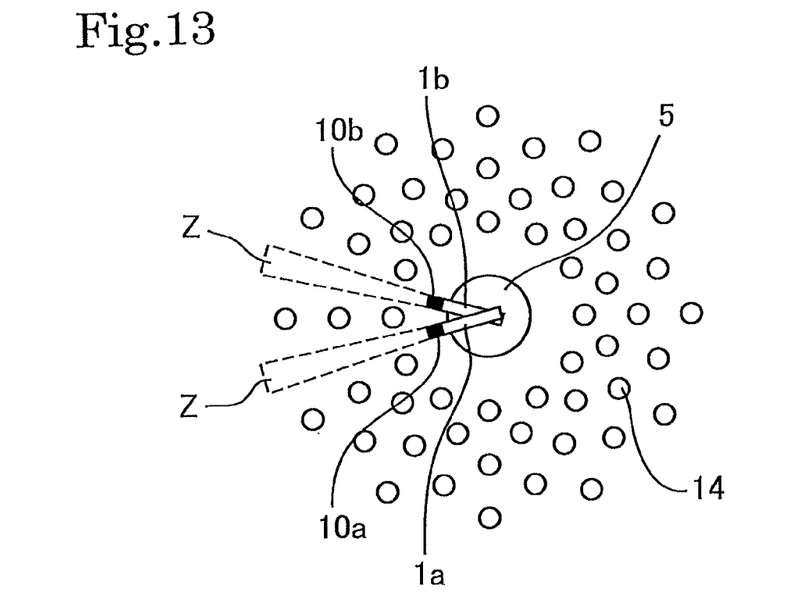
FIG. 13 is a schematic plan diagram of FIG. 4.

As FIG. 13 shows, the solar ray lighting device of this example can reduce the area Z where no heliostats 14 can be provided. Accordingly, more heliostats 14 can be provided.

This example has described a case where the supporting posts are made of reinforced concrete, but the example is not limited to this. For example, each supporting post may have a truss structure formed by trusses made of lattice materials including struts and diagonal bracings. In cases like this, the center reflector may be fixed to a fixation ring (ring) 3 by means of bolts and nuts at a flange portion formed in the circumferential edge portion of the center reflector. In addition, the supporting posts have a conventionally-known truss structure, and are easily constructed. Accordingly, the construction cost can be reduced and the construction period can be shortened.

EXAMPLE 3

In this example, a center reflector 5 is supported by a single supporting post 1 and a cable 6 that is fixed to the supporting post 1 as FIGS. 14 to 17 show.

Figure 14:
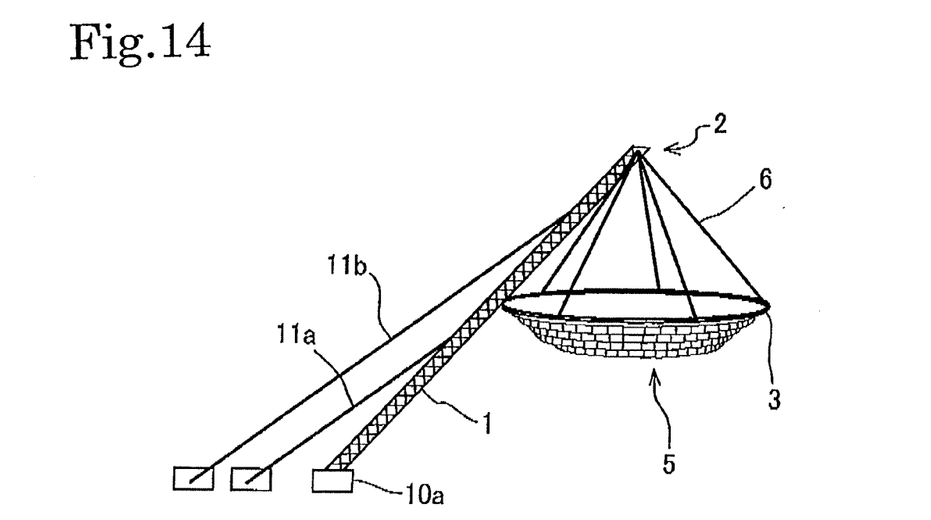
FIG. 14 is a schematic diagram illustrating a third embodiment of a center reflector according to the present invention.

The supporting post 1 to support the center reflector 5 in a solar ray lighting device A is constructed by a method such as the cantilever erection method as in the aforementioned example. In this example, plural back anchors 11a and 11b are provided as FIG. 14 shows, and support the extended supporting post 1 by giving tension to the support post 1. The back anchors 11a and 11b make the supporting post 1 tilt stably. In addition as FIG. 17 (front-side view) shows, the supporting post 1 is formed to be wide.

Figure 15:
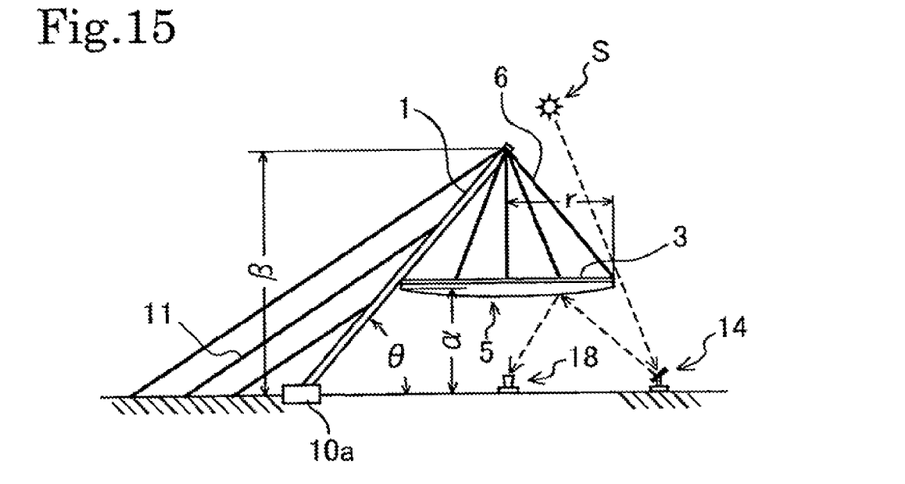
FIG. 15 is a schematic diagram illustrating the third embodiment of a center reflector according to the present invention.

In an example of an embodiment shown in FIG. 15, the supporting post has a height $\beta$ of 130 m and a tilt angle $\theta$ of 50° whereas the center reflector 5 has a diameter of 120 m and is supported at a height $\alpha$ of 60 m.

Figure 16:
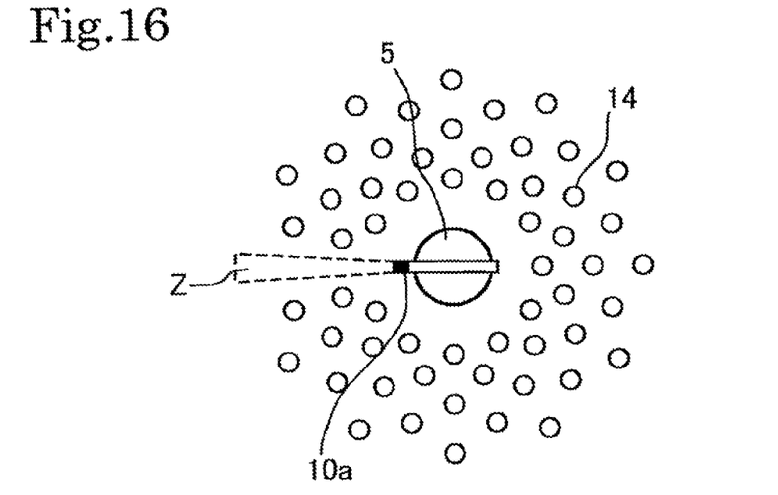
FIG. 16 is a schematic plan diagram of FIG. 14.
Figure 17:
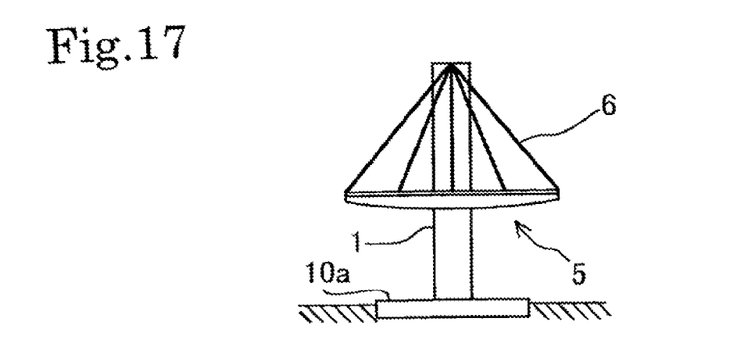
FIG. 17 is a schematic front-side diagram of FIG. 14.

As FIG. 16 shows, the solar ray lighting device A of this example can reduce the area Z where no heliostats 14 can be provided. Accordingly, more heliostats 14 can be provided.

Note that the tilt angles described in Examples 1 to 3 may be changed appropriately for the weight and the diameter of the center reflector unless the gist according to the present invention is changed.

What is claimed is:

1. A solar ray lighting device including:
   a plurality of heliostats to reflect solar rays,
   heat-transfer-medium heating means for heating a heat-transfer medium,
   at least three supporting posts assembled together to form a pyramid, the posts having top ends fixed to each other to form the vertex of the pyramid, and
   a center reflector to concentrate beams of light reflected by the heliostats onto the heat-transfer-medium heating means, the center reflector being fixed to the supporting posts below the vertex of the pyramid so that an outer circumferential edge of the center reflector internally touches the posts.

2. The solar ray lighting device of claim 1, wherein the heliostats are placed so as to surround the center reflector.

3. The solar ray lighting device of claim 1, wherein the heat-transfer-medium heating means is at a position located on the center axis of the center reflector.

4. A method for constructing the solar ray lighting device of claim 1, comprising the steps of:
   standing the supporting posts vertically on anchors,
   attaching a temporary stay cable to each of the supporting posts,
   tilting each of the supporting posts to a predetermined tilt angle while attached to the temporary stay cable,
   connecting and fixing together the top ends of the supporting posts so that the supporting posts form said pyramid, with the top ends forming the vertex of the pyramid, and
   removing the temporary stay cable from each of the supporting posts.

5. The method of claim 4, further comprising the step of lifting up the center reflector and fixing the center reflector to the supporting posts at a predetermined position below the vertex of the pyramid, so that an outer circumferential edge of the center reflector internally touches the supporting posts.

* * * * *